United States Patent [19]
Budge et al.

[11] 3,779,209
[45] Dec. 18, 1973

[54] OYSTER GROWING APPARATUS AND METHOD
[75] Inventors: William W. Budge, Hillsborough; Malcolm Donald, Woodside, both of Calif.
[73] Assignee: Pacific Mariculture, Inc., Pigeon Point, Pescadero, Calif.
[22] Filed: Sept. 23, 1971
[21] Appl. No.: 183,203

Related U.S. Application Data
[62] Division of Ser. No. 42,253, June 1, 1970, Pat. No. 3,638,615.

[52] U.S. Cl. .................................................. 119/4
[51] Int. Cl. ............................................ A01k 61/00
[58] Field of Search ................................. 119/4, 2

[56] References Cited
UNITED STATES PATENTS
3,029,785    4/1962    Maheo .................................. 119/4
3,017,857    1/1962    Munz ................................... 119/4
3,650,244    3/1972    Fordham .............................. 119/4
385,161      6/1888    Beach .................................. 119/4

FOREIGN PATENTS OR APPLICATIONS
1,184,250    2/1959    France ................................. 119/4
11,516       2/1928    Australia .............................. 119/4
1,059,361    3/1954    France ................................. 119/4

Primary Examiner—Hugh R. Chamblee
Attorney—Flehr et al.

[57] ABSTRACT

Apparatus for growing oysters in sea water comprising a member mounted in sea water so that it is above the bottom level of the sea water at all times and below the top surface of the sea water for a substantial period of each 24 hours. A plurality of seed oysters are provided and a cement other than that excreted by the oyster seed secures the oyster seed to the member. The oysters are arranged in a predetermined pattern and are spaced in such a manner that the oysters can grow to a substantially larger size on the member without deforming each other.

In the method, a member is positioned in the sea water so that it is disposed above the bottom level of the sea water and for a substantial period of time of each 24 hours, below the top surface of the sea water. Seed oysters are secured to the member using an adhesive and the oysters are arranged in a predetermined pattern and are spaced in such a manner so that they can grow to a substantially larger size without deforming each other.

5 Claims, 7 Drawing Figures

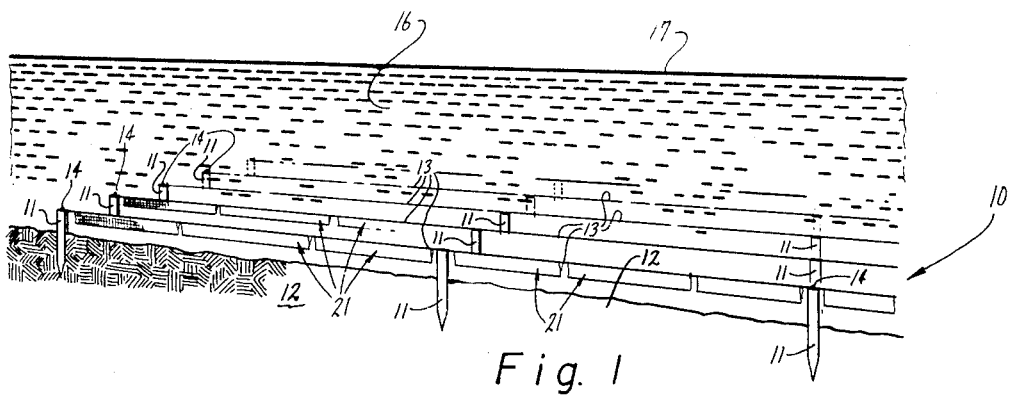
Fig. 1
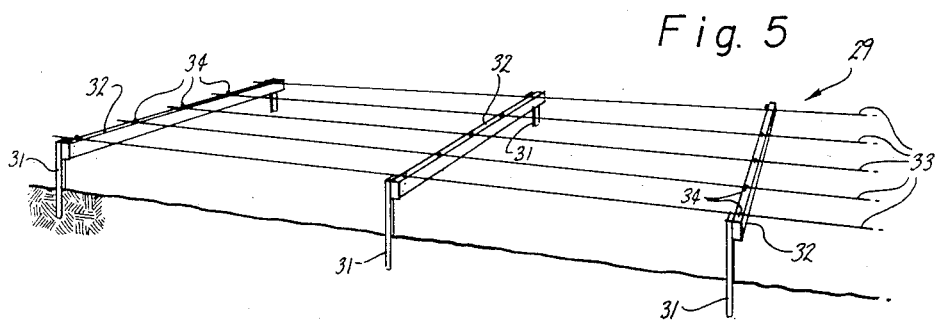
Fig. 5
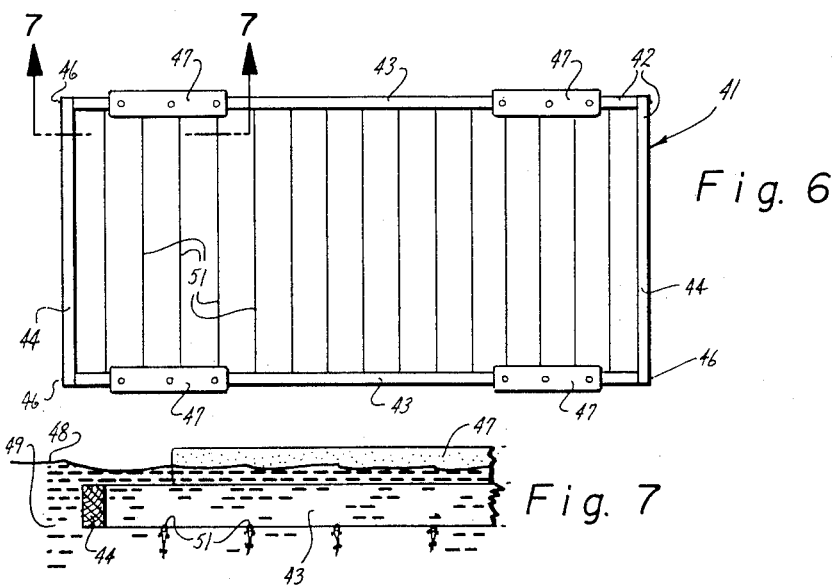
Fig. 6
Fig. 7

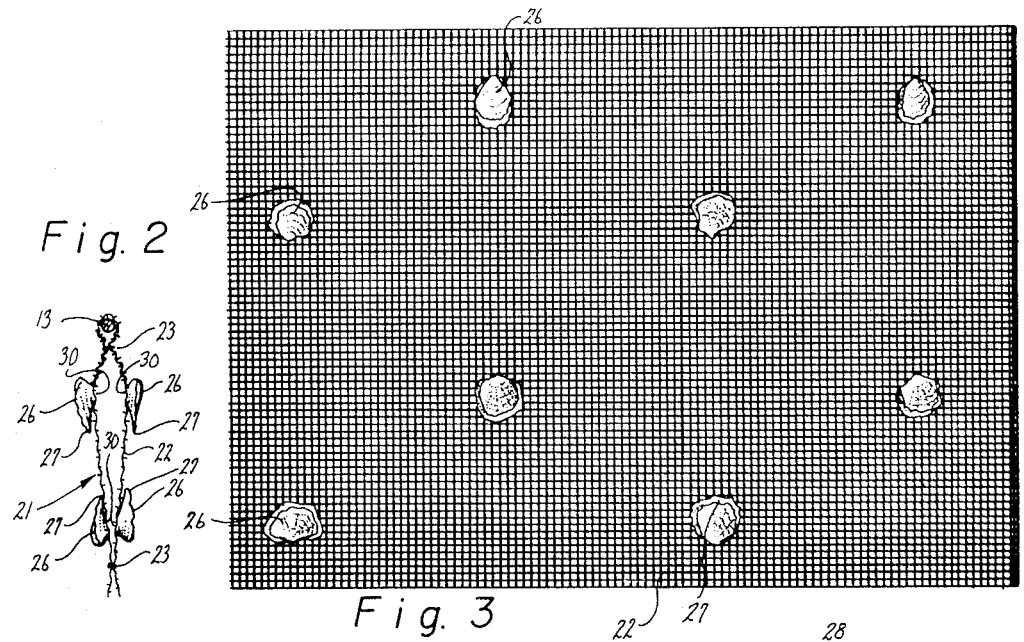
Fig. 2
Fig. 3
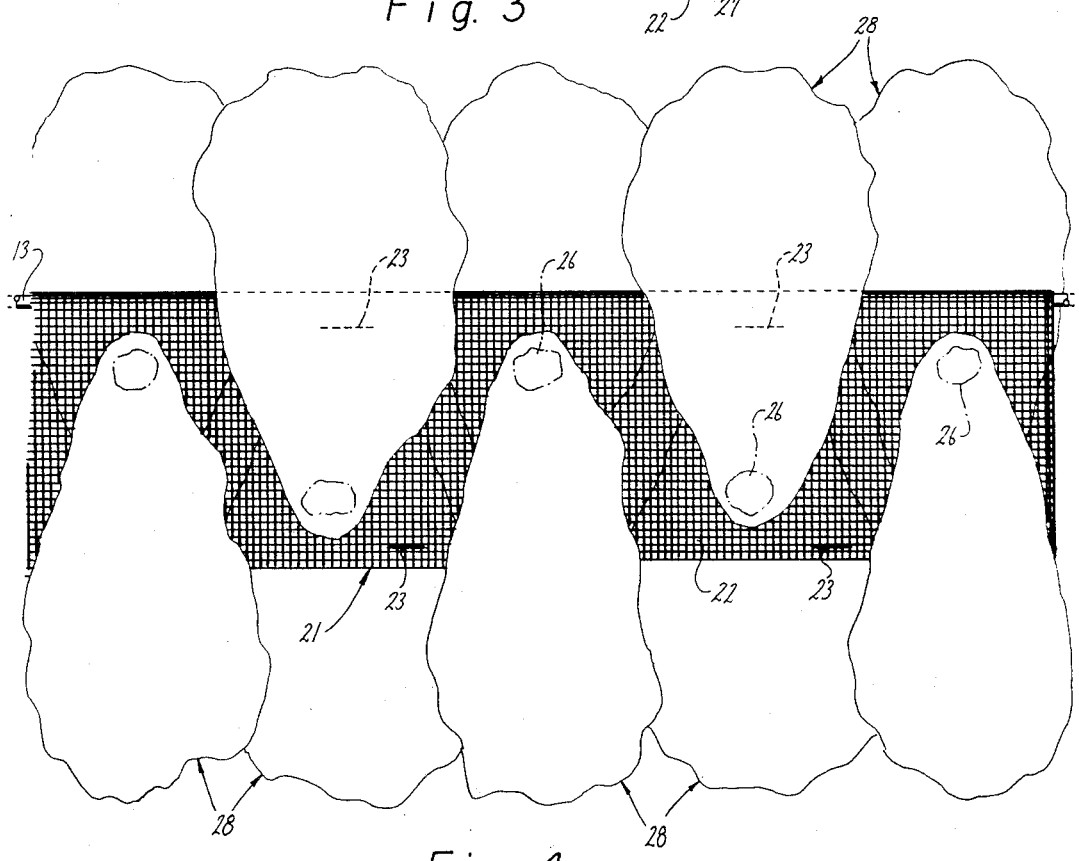
Fig. 4

OYSTER GROWING APPARATUS AND METHOD

This application is a division of application Ser. No. 42,253 filed June 1, 1970, now U.S. Pat. No. 3,638,615, issued Feb. 1, 1972.

BACKGROUND OF THE INVENTION

1. Field of the Invention

This invention relates to an apparatus and method for growing oysters and more in particular for growing oyster seed to a substantially larger size.

2. Description of the Prior Art

In copending application Ser. No. 687,069, filed Nov. 30, 1967, now U.S. Pat. No. 3,526,209, there is disclosed a method and apparatus for growing free oyster spat and in application Ser. No. 758,827, filed Sept. 10, 1968, now U.S. Pat. No. 3,517,748, there is disclosed a method and apparatus for growing free oyster seed. It has been found that when oyster seed is produced in accordance with the teachings in said patent applications, there is still considerable difficulty in causing such oyster seed to grow to maturity. It has been found that when such oyster seed is planted in conventional oyster growing areas such as intertidal areas in the ocean that much of the oyster seed is destroyed by being covered up by the mud and sand or that they are killed or devoured by predators. It also has been found that it is difficult to grow such oyster seed in trays and the like which are suspended in the ocean or sea because of difficulty in keeping the trays clean. There is, therefore, a need for a new and improved apparatus and method for growing oyster seed to maturity.

SUMMARY OF THE INVENTION AND OBJECTS

The apparatus for growing oysters in sea water comprises mounting at least one member and means for mounting the member in the sea water so that it is above the bottom level of the sea water at all times and below the top surface of the sea water for a substantial period of each 24 hours. A plurality of seed oysters are provided and a cement other than that excreted by the oyster is provided for securing the oyster seed to the member in a predetermined pattern. The seed is spaced and positioned in such a manner that the oysters can grow to a substantially larger size without deforming each other.

In the method, a member is positioned in the sea water above the bottom level of the sea water at all times and below the top surface of the sea water for a substantial period of each 24 hours. A plurality of seed oysters are secured by cement to the member in a predetermined pattern with the oysters being arranged and spaced in such a manner that the oysters can grow to a substantially larger size without deforming each other.

In general, it is an object of the present invention to provide an oyster growing apparatus and method which is particularly adapted for growing oyster seed to a substantially larger size such as to an intermediate size.

Another object of the invention is to provide an apparatus and method of the above character which can utilize ocean bottoms otherwise not suitable for oyster culture.

Another object of the invention is to provide an apparatus and method of the above character in which oyster seed can be grown to maturity without deforming each other.

Another object of the invention is to provide an apparatus and method of the above character which makes it possible to grow oysters having a very uniform shape at maturity.

Another object of the invention is to provide an apparatus and method of the above character which greatly increases the survival rate of oyster seed.

Another object of the invention is to provide an apparatus and method of the above character in which oyster seed can be readily put in place and in which the mature oysters can be readily harvested.

Another object of the invention is to provide a method and apparatus of the above character which requires relatively little space.

Another object of the invention is to provide an apparatus and method of the above character which substantially reduces labor costs and which is relatively inexpensive.

Additional objects and features of the invention will appear from the following description in which the preferred embodiments are set forth in detail in conjunction with the accompanying drawings.

BRIEF DESCRIPTION OF THE DRAWINGS

FIG. 1 is an isometric view of apparatus for growing oysters incorporating the present invention.

FIG. 2 is a cross-sectional view of a portion of the apparatus shown in FIG. 1 and in particular shows the member utilized for carrying the oysters and the manner the oysters are secured to the member.

FIG. 3 is a plan view showing a member in the form of a screen and the manner in which the oyster seed is attached to the screen in a predetermined pattern and positioning of the oyster seed so that the oyster seed can grow to maturity without deforming each other.

FIG. 4 is a view showing the oyster seed grown to maturity.

FIG. 5 is a perspective view showing another embodiment of apparatus for growing oyster seed to maturity.

FIG. 6 is a plan view of still another embodiment of apparatus for growing oyster seed to maturity.

FIG. 7 is a cross-sectional view looking along the line 7—7 of FIG. 6.

DESCRIPTION OF THE PREFERRED EMBODIMENTS

The apparatus for growing oysters shown in FIG. 1 consists of a framework 10 formed of a plurality of spaced posts 11 which are driven into the mud or sand forming the ocean or sea bottom 12 in a plurality of spaced parallel rows as shown particularly in FIG. 1. The posts have a length so that their upper extremities are a substantial distance as, for example 6 inches to a foot or more above the ocean or sea bottom. The framework 10 includes a plurality of elongate members in the form of wires 13 formed of a suitable material such as stainless steel or plastic tape which are secured to the posts 11 in a suitable manner. For example, the wires 13 can be mounted on the tops of the posts 12 by staples 14 driven into the tops of the posts. The wires 13 are positioned in such a manner that they extend longitudinally of the rows of posts and are spaced and generally parallel to each other and lie in a horizontal plane generally parallel to the ocean or sea bottom 12.

It is generally preferable that the posts 11 and the wires 13 mounted thereon be positioned in the ocean or sea in such a manner so that they are continuously covered by the sea water 16. The upper surface of the sea water is indicated at 17 in the drawing. It is also possible that the posts and the wires 13 carried thereby can be positioned in intertidal areas, that is, in areas which are not continuously covered with water. However, as is well known to those skilled in the art of growing oysters, it is necessary that the oysters which are growing be covered by sea water for a substantial period of each 24 hours.

Members 21 are carried by the framework 10 which are suitable for the growing of oysters. One such member found to be particularly suitable consists of flexible screen 22 as shown in FIG. 3 which has a relatively fine mesh as, for example, 18 × 14 openings to the inch. It is particularly desirable that the openings in the screen be substantially smaller than the size of the seed oysters which are to be positioned thereon because it has been found that if the mesh of the screen is too large, there is a tendency for the shells of the oyster seed to grow into the mesh of the screen rather than to grow onto the mesh. The screen can be formed of any suitable material which can withstand immersion in sea water for a substantial period of time as, for example, 18 to 24 months. One such material found to be particularly satisfactory are screens formed of fiberglass or plastic. Other materials can be utilized if desired as long as they are not toxic to oysters and can withstand immersion in sea water for a period of time ranging to two years. However, it is desirable to utilize a screen which is relatively inexpensive so that it can be thrown away rather than re-used. The screen 22 is cut into appropriate lengths and widths; for example, it can have a length of 24, 36 or 48 inches or any other appropriate length and a suitable width such as 4 to 6 inches. The lengths of screen are folded over wires 13 and are secured thereto by suitable means such as staples 23.

In copending application Ser. No. 687,069, filed Nov. 30, 1967, now U.S. Pat. No. 3,526,209, and application Ser. No. 758,827, filed Sept. 10, 1968, now U.S. Pat. No. 3,517,748, there are disclosed methods and apparatus for growing free or loose oyster seed to a size such that it is a substantial period of time, as for example several months, past the larval stage with no remaining ability to cement itself to anything. As is well known to those skilled in the art of growing oysters, oyster larvae that grow in the natural environment will cement themselves onto cultch or substrates when they pass through metamorphosis and set at the age of 2 to 3 weeks. At this time a cement is extruded from a gland carried by the oyster larvae and is placed on the substrate. The oyster larvae then lays its shell into the drop of cement which has been extruded and is thereafter attached for the remainder of its life to the substrate. As the young oyster grows, its shell expands over the substrate closely following its contour. This latter shell growth strengthens the oyster bond to the substrate but is a separate and distinct process from the cementing which is done at the time of setting of the oyster. This natural setting process of the oyster larvae is a random phenomena. The oyster larvae are very gregarious and often set many hundred to a square inch on parts of the substrate which the oyster larvae find is particularly attractive while other parts are unattractive and have very few or no oyster larvae setting thereon. Thus, the alignment of the oyster larvae on natural setting is random and generally is undesirable because many areas will be overcrowded. Where the areas are overcrowded, young oysters grow into each other which deforms their shells and also reduces their size. In addition, the oysters are in a continuous conflict for space and food. Therefore, the mortality rate is very high and only a small fraction, for example, a portion of one percent of the oyster larvae are able to grow to maturity.

In the present invention, the oyster seed or larvae are grown free or loose as described in the above identified applications to a stage where they are a substantial period beyond the stage at which the oyster seed can cement itself to a substrate. If screen 22 is to be utilized for the member 21 for supporting the oysters above the ocean bottom or bed, the screen is laid out flat and thereafter seed oysters 26 are arranged on the screen in a predetermined pattern. The oyster seeds in this stage already have a shell. The forward extremity of which is called a "bill" 27 and which indicates the direction in which the shell will grow as the oyster continues to grow to maturity.

As shown in FIG. 2, the screen 22 is adapted to be folded in half so that one-half of the screen is on one side of the wire 13 and the other half is on the other side of the wire 13. As also can be seen from FIGS. 2 and 3, the oyster seed are arranged in two separate rows on each side with the oysters in each row being staggered with respect to the oysters in the other row and with the oysters in the first or bottom row having their bills pointed in one direction or, in other words, in an upward direction, whereas the oysters in the second or top row are positioned so that their bills are pointed in the opposite direction or, in other words, in a downward direction.

After the oyster seed has been properly oriented and arranged, means is provided for permanently securing the oyster seed in the desired positions on the screen. Such securing means is preferably in the form of a cement other than that excreted by the oyster and which can withstand immersion in sea water for a substantial period of time as, for example, 18 to 24 months. By way of example, any of the conventional water-proof cements can be utilized. Plastic cements such as epoxies also can be utilized where appropriate. Thus, a small drop of the cement or adhesive is applied either to the screen in the place where it is desired to position the oyster seed or on the oyster seed itself at 30 and then the oyster seed is positioned on the screen. The oysters are positioned so that their bills angle towards the screen so that as the oyster grows, the shell will grow out along the screen and will adhere to it. The adhesive or cement is allowed to harden. This operation of securing the oyster seed on the screen can be accomplished out of the water because the oyster seed is capable of surviving out of the water for a substantial period of time as, for example, 24 hours or more.

After the oyster seed has been attached to all of the screens, the screens can be taken to the ocean and mounted on the wires 13 by folding the same over the wires and stapling them to the wires as hereinbefore described. The oysters can then grow to maturity from this stage on. The bills will continue to grow on the surface of the fiberglass screen 22 in the direction in which they are pointed. Thus, as shown particularly in FIG. 4, the oyster seed in the bottom row will have their bills grow upwardly, whereas the oyster seed in the top row will have their bills grow downwardly. It has been found that as the oyster grows, the new shell growth will have some tendency to adhere to the surface of the screen and will generally follow the surface of the screen. It can be seen that the oyster seed is spaced in such a manner that the oysters can grow to maturity without coming into contact with each other and thus deforming each other. In addition, the oysters are spaced sufficiently far apart so that they have adequate access to sea water and the food in the sea water so that they can grow rapidly to maturity. By positioning the oyster seed a substantial distance above the bottom surface of the ocean bed or bottom, there is no tendency for the oysters to become covered with silt or sand. In addition, it is more difficult for predators to attack and destroy the oyster seed. In general, it can be stated that the present method and apparatus makes the growing of the oyster seed to maturity substantially maintenance-free and, therefore, substantially reduces the cost of growing oysters to maturity.

After the oysters have reached maturity approximately 18 to 24 months after they have first been placed in the sea water, the oysters can be harvested. Since oysters are in the same environment and have generally the same access to food and space, all the oysters will reach maturity at substantially the same time.

The mature oysters 28 can be harvested in a suitable manner. For example, the screen 22 can be clipped or cut along the wire 13 and removed progressively in sections. Thereafter, the oysters can be packaged and/or shucked in a conventional manner. The oysters are easier to shuck because they are of a uniform size and because they are not bunched into clusters. As soon as the oysters have been removed from the wires 13, new screens carrying new seed oysters can be placed on the wires 13 in the manner hereinbefore described.

Alternatively, if desired, when harvesting the oysters, the wires 13 can be removed with the adult oysters thereon. The screens can then be stripped therefrom and the wire replaced on the framework 10.

Another apparatus for the growing of oysters is shown in FIG. 5 and consists of a framework 29 formed of a plurality of posts 31 which are again driven into the ocean bottom and which are arranged in pairs and have cross members 32 in the form of 2×4's mounted thereon. The cross members 32 are arranged so that they are spaced a substantial distance apart and are generally parallel to each other. Elongate members in the form of wires 33 extend across the cross members and are secured thereto in a suitable manner such as by staples 34 so that the wires are spaced and parallel and generally lie in a plane which is parallel to the ocean or sea bottom. It can be seen that with such an arrangement, the members 21 of the type hereinbefore described with the oyster seed thereon can be mounted on the wires.

Still another apparatus for the growing of oysters is shown in FIGS. 6 and 7 and is particularly useful where it is not convenient or undesirable to position the oysters adjacent the ocean bottom as, for example, in locations where the sea water is too deep to make it economically feasible. For this purpose, a plurality of rafts 41 can be provided which are anchored to the sea bottom. The rafts 41 can be constructed of any suitable material. For example, the rafts can consist of a wooden framework 42 formed of spaced and parallel side members 43 and spaced and parallel end members 44 which are fastened together by suitable means such as nails 46. Floats 47 formed of a suitable material such as polyurethane foam are secured to the side members 43 and are provided to ensure that the framework 42 floats adjacent the surface 48 of the sea or ocean 49. A plurality of elongate members in the form of wires 51 are mounted on the framework 42 in such a manner so that they are positioned a substantial distance below the surface 48 of the sea or ocean so that they will not be uncovered by the normal wave action of the sea or ocean. Thus, the wires 51 have been shown secured to the bottom side of the framework 42 by suitable means such as staples (not shown). The wires 51 are mounted so that they are spaced apart and parallel. Screens 22 of the type hereinbefore described carrying seed oysters are mounted on the wires 51 in the manner hereinbefore described. The seed oysters again can grow to maturity. They again are positioned a substantial distance above the surface of the bottom of the sea or ocean so that they are relatively inaccessible to predators. In addition, they are positioned in such a manner so that they will be covered by sea water for a substantial period of each 24 hours. In fact, they should be covered continuously except for the abnormal occasion when a large wave may pass through the raft and cause the oyster seed to be uncovered momentarily. Again, the oyster seed should be able to grow to maturity with very little attention. It may be desirable to place a cover 52 of a suitable material such as plywood over the top of the raft. The cover will shade the raft from the sun and thus will inhibit the growth of algae and slime which could possibly cover the oysters and retard their growth.

Although the present apparatus and method have been described utilizing wires and screens carrying oyster seed, it is apparent that other members can be utilized for the growing of the oyster seed. For example, in areas where wood is relatively inexpensive, the entire framework which is utilized for supporting the oysters can be formed of wood. The oyster seed can be attached to the wood in the same type of pattern as is attached to the screen. The oyster seeds can then grow to maturity on the wood in the same manner as they would on the screen. In harvesting the oysters, they can merely be stripped from the wood members which, by way of example, may be 2×4's.

Also, even though the present apparatus and method have been described as being utilized for growing the oysters to maturity, the apparatus and method can also be utilized for growing oysters to a smaller size but to a size substantially larger than the oyster seed as, for example, in an intermediate size ranging from 1 to 3 inches in maximum dimension. At the time the oysters have reached this intermediate size, they can be removed by stripping the screen from the framework in the manner hereinbefore described. The screen can be used in pieces in which a number of oysters are on each piece of screen or, alternatively, the screen can be cut into smaller pieces so that there is only one oyster on each screen. The oysters can then be grown to maturity in a conventional manner. For example, they can be spread on the ocean bottom with the pieces of screen attached and thereafter be permitted to grow to maturity. Growing of the oysters to this intermediate size is advantageous because when the oysters are of this larger size, they are more immune to predators and silting. After the oysters have been grown to maturity, they can be harvested in a conventional manner.

In view of the foregoing, it can be seen that there has been provided a novel apparatus and method for growing oyster seed to maturity which greatly reduces the cost of growing oysters and also provides a uniform, high quality oyster which can be readily shucked if desired. The survival rate of the oyster seed is very high.

We claim:

1. In apparatus for growing oysters in sea water, a framework, horizontally disposed elongate members mounted on the framework, means mounting the framework in the sea water so that it is above the bottom of the sea at all times and below the top surface of the sea water for a substantial period of each 24 hours, a fiberglass screen folded over each of said elongate members to provide two depending portions which hang free downwardly from the elongate member and the framework to provide two vertically disposed outwardly facing surfaces, fastening means adjacent each of said elongate members for securing thereto the screen folded over the elongate member, a plurality of seed oysters, and a waterproof cement other than that excreted by the oyster for securing the oysters to said two surfaces, said oysters being arranged in a predetermined pattern so that the oysters can grow to a substantially larger size without deforming each other.

2. Apparatus as in claim 1 wherein the seed oysters are arranged in at least two rows on said two surfaces of the screen with the oysters in each row being staggered with respect to the oysters in the other row and with the oysters in one row having their bills facing in one direction and with the oysters in the other row facing in the opposite direction.

3. Apparatus as in claim 1 wherein said framework is mounted on the bottom of the ocean in such a manner that the elongate members are disposed a distance of at least approximately 6 inches above the bottom of the ocean.

4. Apparatus as in claim 1 wherein said framework is in the form of rafts which are adapted to float adjacent the surface of the water and wherein the elongate members are mounted on the raft so that they are disposed a substantial distance below the surface of the water so that they will not be uncovered by the normal wave action of the ocean.

5. Apparatus as in claim 4 together with a cover mounted on said raft for reducing the amount of sunlight to which the raft and the oyster seed carried thereby are exposed.

* * * * *